UNITED STATES PATENT OFFICE.

HENRY DREYFUS, OF BASEL, SWITZERLAND.

CELLULOID SUBSTITUTE AND PROCESS OF MAKING SAME.

1,242,783.      Specification of Letters Patent.      Patented Oct. 9, 1917.

No Drawing. Original application filed October 2, 1911, Serial No. 652,444. Divided and this application filed November 12, 1914. Serial No. 871,833.

*To all whom it may concern:*

Be it known that I, HENRY DREYFUS, doctor of philosophy, a citizen of the Republic of Switzerland, residing at Basel, Switzerland, have invented certain new and useful Improvements in Celluloid Substitutes and Processes of Making Same, of which the following is a specification.

The present invention relates to the production of celluloid substitutes, produced by the employment of a mixture of trichlorethylene and alcohol, as a solvent for certain particular cellulose acetates soluble therein, to which camphor substitutes may be added. The new celluloid substitutes are free from certain of the objectionable features possessed by celluloid and by many of the celluloid substitutes heretofore employed, in particular, the objections of being brittle, non-transparent and unstable. The solution of the cellulose acetates, with or without camphor substitutes, in the mixture of trichlorethylene and alcohol, can also be employed for varnishes, coatings and the like, and for the manufacture of films.

It will be obvious that in order to dissolve cellulose acetate in a mixture of alcohol and trichlorethylene, a cellulose acetate must be employed, which is soluble in said mixture. A method of making such a cellulose acetate is described and claimed in my copending application, Serial No. 782,530, filed August 1, 1913, and is also described in my French Patent 432,046 of July 5, 1911.

Such a cellulose acetate may for example be prepared by first introducing 200 parts of cellulose, for example cotton containing about 5% of moisture, into a mixture of 800 parts of glacial acetic acid and 20 parts of concentrated sulfuric acid. Into this mixture, while constantly stirring, and while maintained at about ordinary room temperature, or at a temperature not exceeding about 30° C., about 200 to 250 parts of acetic anhydrid are slowly added. This addition may be made at once, or after two or three hours. The cellulose eventually dissolves in the acetylizing mixture, producing a cellulose acetate, which is insoluble in chloroform, insoluble in dilute alcohol, but soluble in alcohol-chloroform, and in alcohol tetrachlorethane. A further reaction, for the changing of the solubilities of the cellulose acetate may then be allowed to go on, while the acetate is still in the original acetylizing solution, after adding any substance capable of preventing further acetylization, but incapable of preventing the desired changes in the solubility, until a product is produced, which is readily soluble in a mixture of alcohol and trichlorethylene (equal parts for example) as shown by a test portion, at which time the said further reaction is stopped, and the cellulose acetate precipitated from the solution, washed, pressed and dried.

The present application is a division of my prior application Serial Number 652,444, filed Oct. 2, 1911, (now U. S. Patent #1,181,858).

The production of a non-inflammable celluloid has been the subject of much research during late years, and either with nitro-cellulose in combination with camphor or camphor substitutes capable of reducing inflammability, or with acetyl cellulose and camphor or camphor substitutes. Although many such substitutes have been proposed, none of them has been capable of replacing camphor, as in general they have not fulfilled the requirements demanded of a camphor substitute.

The properties of a celluloid substitute prepared from cellulose acetate, by means of a liquid solvent, and a camphor substitute, with or without filling materials, coloring materials, materials capable of altering the degree of hardness of the product, and materials added for the purpose of producing special properties in the product, depend upon (among other things) the character of the particular cellulose acetate employed, especially upon its solubility or insolubility in certain solvents, whether simple or mixed, and depend also upon the particular solvent employed in producing the celluloid substitute. Especially those cellulose esters which are soluble in acetone and in chloroform, or are soluble in acetone and insoluble in chloroform, are of importance. They have been found to be of particular value, and products made therefrom have been found to possess certain advantages over many of the celluloid substitutes heretofore proposed, particularly as regards their elasticity, hardness, transparency, and the readiness with which they may be worked (whether in the finished or unfinished condition) upon the ordinary celluloid working machines. Care must be taken in producing the solution, to employ the proper proportions of the solvent to the cellulose ester, also to employ the proper proportions of the ingredients of the solvent, relative to each other. While in the patent literature it is stated, that: trichlorethylene alone, or with alcohol, is not a solvent for cellulose acetate (see patents treating trichlorethylene as a solvent for cellulose acetate), I have found that it is a good solvent having a low boiling point for certain cellulose acetates, and that it gives good results. I mention particularly a mixture of substantially equal volumes of trichloroethylene and alcohol, which mixture will preferably be used in amount not exceeding about 80 to 100% of the weight of the cellulose ester employed, so far as it concerns celluloid making, while for solutions serving for varnishes and the like, this quantity can be increased.

The solution of cellulose acetate in the mixture of alcohol and trichlorethylene, may also be modified, by the addition thereto of castor oil or other softening agents, such as camphor substitutes or other solvents or by the addition of filling or coloring agents, such coloring agents being soluble in the mixture, or insoluble therein, according to the particular effect desired. The camphor substitutes, such as methyl acetanilid, or other substances having a similar effect, must be added for celluloid making, as alcohol trichlorethylene is only a mixture having a low boiling point, and serves as a vehicle for incorporating the camphor substitutes.

The present process is illustrated by the following examples:—

*Example.*

80 kilos of cellulose acetate, easily soluble in alcohol-tetrachlorethane are mixed with about 40 liters of alcohol and 40 liters of trichlorethylene, in connection with a camphor substitute in an appropriate quantity, and kneaded to a sufficient extent, preferably while warm; the mass becomes homogeneous and clear and transparent. It is then worked up on rollers and in presses, and the resulting block may be cut into plates or sheets of the desired thickness which can be further worked up and dried and dressed or polished according to the requirements.

To the above mixture there may be added, either at the beginning or later on, such substances as castor oil, or mineral or organic coloring materials, or filling agents, according to the use in view. If it is desired to produce an imitation tortoise shell the mass is divided into two or more equal or unequal parts, one of which parts may be colored with a suitable coloring matter, such as Bismark brown, methylene blue, Victoria blue, after which the colored portion is mixed with the uncolored portion or portions by suitable working up on rollers.

In this example, the camphor substitutes may be methyl acetanilid (manol) or similar substances, with a relatively small quantity of triphenyl phosphate, or its homologues, in order to make the product non-inflammable.

Instead of being worked up on machines, the mass may be cast into molds, directly, or after the addition of filling materials, oils, coloring matters, and films, or other objects of all kinds may be made therefrom, or there may also be made solutions for varnishes.

What I claim is:—

1. A viscous, concentrated solution of a cellulose acetate in a solvent comprising alcohol and trichlorethylene.

2. A viscous, concentrated solution containing cellulose acetate and manol, in a solvent comprising alcohol, trichlorethylene and another chlorinated hydrocarbon.

3. A clear transparent composition of matter comprising as an essential constituent thereof, a cellulose acetate soluble in a mixture of alcohol and trichlorethylene.

In testimony whereof, I have hereunto subscribed my name.

Dr. HENRY DREYFUS.

Witnesses:
 ARNOLD ZUBER,
 WILLIAM MURRY.